United States Patent

[11] 3,597,636

| [72] | Inventor | Svyatoslav Anatolievich Kravchenko<br>Kirovsky prospekt 65, kv. 29, Leningrad, U.S.S.R. |
|---|---|---|
| [21] | Appl. No. | 738,869 |
| [22] | Filed | June 21, 1968 |
| [45] | Patented | Aug. 3, 1971 |

[54] INDICATOR OF ZERO PHASE ANGLE BETWEEN TWO VOLTAGES
5 Claims, 1 Drawing Fig.

[52] U.S. Cl............................................... 307/232,
328/110, 328/114, 307/286, 307/295, 307/322
[51] Int. Cl....................................................... H03k 5/20
[50] Field of Search.......................................... 307/232,
233; 328/111

[56] References Cited
UNITED STATES PATENTS

| 2,806,946 | 9/1957 | Rich................................ | 328/110 |
| 3,253,154 | 5/1966 | Kawamoto et al............. | 307/286 |
| 3,289,011 | 11/1966 | May............................... | 307/286 |
| 3,223,850 | 12/1965 | Carozza et al................ | 307/232 |

OTHER REFERENCES
NonDestructive Tunnel Diode Memory Cell by Amodei RCA TN No. 468 Sept. 1961, 5 pages.

Primary Examiner—John S. Heyman
Assistant Examiner—Harold A. Dixon
Attorney—Waters, Roditi, and Schwartz ABSTRACT: A phase angle difference sensing circuit for sensing a zero phase angle between two voltage signals comprises two channels, each of the two channels having a respective input and output, each of the voltage signals being applied to a respective input of the two channels, two pulse transformers, each of the pulse transformers being connected in a respective channel and forming the input of the respective channel, a first pair of tunnel diodes, each of the first pair of tunnel diodes being connected in series with a respective primary winding of the two pulse transformers, a pair of auxiliary DC voltage sources, a pair of adjustable resistors, respective one of the pairs of DC voltage sources and adjustable resistors being connected in series and in series with respective primary windings of the two pulse transformers, a pair of pulse amplifiers, each of the pair of pulse amplifiers being connected to respective secondary windings of the two pulse transformers, a two-input coincidence circuit, the outputs of the two channels being connected to respective inputs of the two-input coincidence circuits, a pulse former, the pulse former being connected to the output of the coincidence circuit, and a registering device connected to the pulse former.

PATENTED AUG 3 1971    3,597,636
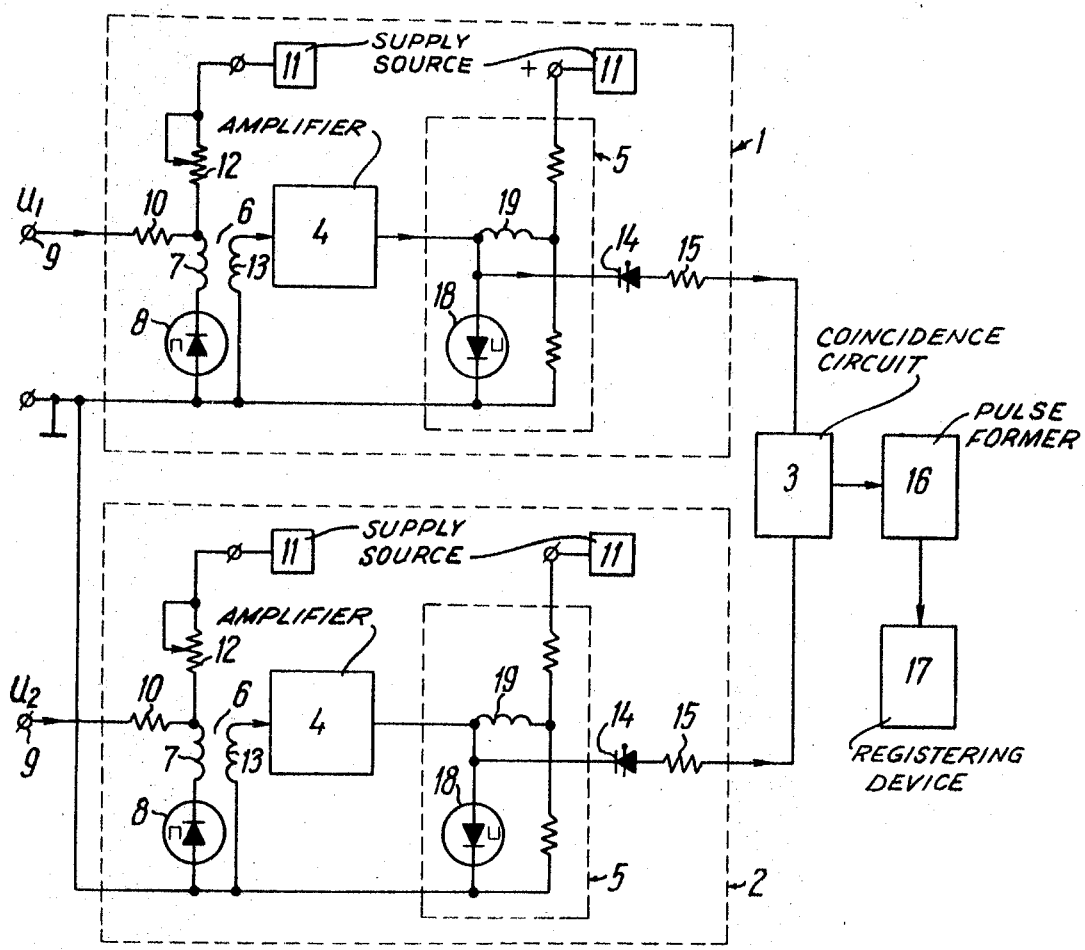

INDICATOR OF ZERO PHASE ANGLE BETWEEN TWO VOLTAGES

This invention relates to electrical metering devices and more particularly to indicators of zero phase angle between any two voltages for use in sonic and infrasonic phase calibrators, in AC bridges, in current and power comparators and in other control and metering systems.

Most devices for indicating zero phase angle at the present time involve the use of threshold and differentiating circuits in each of two channels for the voltages being compared which are connected to a coincidence circuit which has a registering device at its output. When these voltages pass through zero levels a signal is produced in each channel which is equal to a threshold level of threshold circuits. Pulse spikes produced as a result of differentiation of this signal are applied to the coincidence circuit. Valve or transistor Schmitt triggers are usually selected as coincidence circuits for these devices.

The principal drawback of known devices is the dependence of the threshold level of threshold circuits upon ambient temperature changes. When referring to transistors, their temperature coefficient is within 2 to 2.5 mV per 1° C. and a minimum width of differentiated pulses is within 0.5 to 1 microsecond. Such valves ensure phase accuracy in time of only about 1° which is considerably lower than an accuracy obtainable with the transistors in high frequency range.

It is therefore an object of this invention to provide an indicator of zero phase angle between two voltages that will ensure a high accuracy of indication of the phase relationship due to high stability of the threshold level of threshold circuits in an ambient temperature range of at least 15° to 35° C.

In accordance with an embodiment of this invention use is made of an indicator of zero phase angle between two voltages of mostly sonic and infrasonic frequencies incorporating two channels with pulse amplifiers, wherein pulse spikes are produced at the moment of the voltage passes through zero, in which a pulse transformer and a tunnel diode are connected in series to the input of each channel, the primary winding of the pulse transformer being connected by a resistor to an auxiliary D.C. voltage source and its secondary winding being connected to the input of the pulse amplifier.

Other objects and advantages of the invention will hereinafter become more fully apparent from the following description of the annexed drawing which is a schematic representation of one embodiment of the invention.

Referring now to the drawing it will be seen that an indicator of zero phase angle between two sinusoidal voltages $u_1$ and $U_2$ of sonic and infrasonic frequencies incorporates channels 1 and 2 connected to a coincidence circuit 3. Each channel 1 and 2 includes a pulse amplifier 4 and a pulse spikes former 5 coupled to the output of the amplifier 4. The output of each channel 1 and 2 incorporates a pulse transformer 6 with the primary winding 7 connected in series to a tunnel diode 8. The primary winding 7 is coupled through a load resistor 10 to an input terminal 9 and through an adjustable resistor 12 to an auxiliary supply source 11.

Tunnel diode 8 is biased so that it operates as a flip-flop in the current switch mode. Secondary winding 13 of pulse transformer 6 is coupled with the pulse amplifier 4.

The pulse spikes former 5 of each channel 1 and 2 is connected to the input of the coincidence circuit 3 through a reverse-biased diode 14 and resistor 15.

Coincidence circuit 3 is coupled with a pulse former 16, t 16, the output of which is connected to a registering device 17, for example, a flashlamp.

The indicator operates in the following manner.

Two sonic or infrasonic voltages $U_1$ and $U_2$ are applied to terminals 9. As the voltage passes through zero, the tunnel diode flip-flops are actuated and transforms the sinusoidal voltages into square pulses. Pulse transformer 6 passes the leading and trailing edges of the square pulses to the input of amplifier 4 wherein the pulses are amplified, that is, their slope is sharpened.

Pulse spikes former 5 employing tunnel diode 18 and inductance 19 produces extremely narrow pulse spikes about 5 to 10 nanoseconds in width. These pulse spikes formed in both channels 1 and 2 are applied to the coincidence circuit 3. The output of coincidence circuit 3 will be present only upon simultaneous occurrence of pulse spikes from the two channels. This output consists of a pulse which is expanded in width by the pulse former 16 and is indicated by the flashlamp. The flashlamp will flash at a frequency equal to that of the applied pulses in case the phase angle between the voltages $U_1$ and $U_2$ is equal to 0.

If the phase angle between the two voltages is other than zero, the pulse spikes from the formers 5 do not coincide at the input of the coincidence circuit 3. As a result the latter will not produce a pulse at its output and the flashlamp will not operate.

The invention provides an indicator of zero phase angle between two voltages of sonic and infrasonic frequencies whose phase accuracy requirements may be as stringent as 0.1° in an ambient temperature range of 15° to 35° C.

Although this invention has been described with respect to a particular embodiment thereof, it is not to be so limited as changes and modifications may be made therein which will be readily apparent to one skilled in the art to which the invention pertains and which are within the full intended scope of the invention as defined by the appended claims.

What I claim is:

1. A phase angle difference sensing circuit for sensing a zero phase angle between two voltage signals comprising two channels, each of said two channels having a respective input and output, each of said voltage signals being applied to a respective input of said two channels, two pulse transformers, each of said two pulse transformers being connected in a respective channel and forming said input of said respective channel, a first pair of tunnel diodes, each of said first pair of tunnel diodes being connected in series with a respective primary winding of said two pulse transformers, a pair of auxiliary DC voltage sources, a pair of adjustable resistors, respective one of said pairs of DC voltage sources and adjustable resistors being connected in series and in series with respective primary windings of said two pulse transformers, a pair of pulse amplifiers, each of said pair of pulse amplifiers being connected to respective secondary windings of said two pulse transformers, a two-input coincidence circuit, said outputs of said two channels being connected to respective inputs of said two-input coincidence circuit, a pulse former, said pulse former being connected to the output of said coincidence circuit, and a registering device connected to said pulse former.

2. A phase angle difference sensing circuit as claimed in claim 2, wherein said pulse former includes means for producing a single pulse when a phase difference exists between said two voltage signals.

3. A phase angle difference sensing circuit as claimed in claim 2, including a pair of pulse spike formers, each of said pair of pulse spike formers being connected in a respective channel and connected between said pulse amplifier in a respective channel and a respective input of two-input coincidence circuit.

4. A phase angle difference sensing circuit as claimed in claim 3, wherein each of said pulse spike formers includes a tunnel diode.

5. A phase angle difference sensing circuit as claimed in claim 3, wherein each of said pulse spike formers includes means for producing a pulse having a width no greater than 10 nanoseconds.

UNITED STATES PATENT OFFICE
CERTIFICATE OF CORRECTION

Patent No. 3,597,636     Dated August 3, 1971

Inventor(s) Svyatoslav Anatolievich Kravchenko

It is certified that error appears in the above-identified patent and that said Letters Patent are hereby corrected as shown below:

Column 1, line 25, "valves" should appear -- values --; line 48, "$u_1$" should appear -- $U_1$ --; line 64, cancel "t"; line 65, cancel "16" line 70, "transforms" should appear -- transform --; column 2, line 54 "claim 2" should appear -- claim 1 --; line 58 "claim 2" should appear -- claim 1 --.

Signed and sealed this 12th day of December 1972.

(SEAL)
Attest:

EDWARD M. FLETCHER, JR.
Attesting Officer

ROBERT GOTTSCHALK
Commissioner of Patents